3,266,913
MARINE ANTIFOULING COMPOSITION AND
METHOD OF TREATING SURFACES
Walter L. Hardy, Deerfield, and Clarence W. Huffman,
Glenview, Ill., assignors to International Mineral &
Chemical Corporation, a corporation of New York
No Drawing. Filed Nov. 14, 1962, Ser. No. 237,731
11 Claims. (Cl. 106—15)

This invention relates to marine antifouling agents and to a process for protecting ship and boat bottoms, wharves, docks, pilings, and the like, from attack by barnacles and other marine organisms which have a deteriorative effect on such objects. More particularly, this invention relates to novel antifouling compositions comprising toxic metal salts of amino acids and to a process for killing barnacles, marine algae, teredos and other objectionable marine parasites. The compositions may also be used to impregnate wood, textiles, rope, elastomers, etc., to protect such articles against fungus, organic agents of decay associated with the soil, etc. As marine conditions pose the most strenuous problem in this regard, the invention will be discussed in terms of such use but the invention is not limited thereto.

It has previously been known to employ copper salts, copper oxide and particularly inorganic copper salts in marine antifouling paints and other antifouling compositions. Moreover, such substances as copper naphthenate, zinc naphthenate, arsenous oxide, oxides of mercury, red lead, organic tin compounds, Paris green, etc., have been known and have been employed in marine antifouling paints for use not only on cellulosic substances as wood, but also on steel, aluminum and fiber glass bottom boats. These substances vary both in effectiveness and cost.

In addition, it has been known to employ water-soluble organic salts of copper, such as copper acrylate, copper furoate, etc., as fungicides. Such substances by reason of their water solubility are usually unsuitable for use on any surface which is to be exposed to water either continuously or periodically. It has further been known, as is disclosed in U.S. Patent 2,443,033, to incorporate in marine antifouling paints mytilotoxin and other ptomaine substances and their metallic salts. These materials, while extremely toxic to barnacles and other objectionable marine organisms, have not found widespread use commercially because they are equally toxic to fish and other desirable marine life and to human beings. Thus, fish may feed upon contaminated organisms.

It is the primary object of this invention to provide a highly effective water-insoluble composition to be used to inhibit marine fouling of a variety of surfaces, which composition has a long lasting effect, is toxic to undesirable marine organisms but, as used, of negligible toxicity to desirable marine life and to human beings.

It is a further object of this invention to provide a highly effective composition for use in marine antifouling paints which is rapidly absorbed by marine organisms of the type which commonly attach themselves to boat bottoms, such as barnacles, marine algae, teredos, bryozoans, etc.

Again, it is an object of this invention to provide a method of protecting ship and boat bottoms, airplane pontoons, wharves, docks and other wood surfaces including fence posts, pilings, boat trims and planking, as well as rope, elastomers, canvas products, etc., from decay and other forms of attack by marine organisms, soil decay agents, fungi and bacteria.

It is another object of this invention to provide a marine antifouling agent comprising a water-insoluble salt of an amino acid with a toxic metal such as copper, mercury, zinc, lead and the like.

Still another object of this invention is to provide a method of protecting surfaces which are to be exposed to marine fouling agents which comprises applying a composition comprising a water-insoluble salt of an amino acid with a toxic metal such as copper, mercury, zinc, lead and the like.

A specific object of this invention is to provide a marine antifouling composition containing as its essential active ingredient a salt of glutamic or aspartic acid or a mixture of these acids with copper, zinc or another metal which is toxic to objectionable marine organisms.

A further specific object of this invention is to provide a method of protecting surfaces to be exposed to marine fouling agents against such fouling action by applying thereto a composition containing as its essential active ingredient a salt of glutamic or aspartic acid or a mixture of these acids with copper, zinc or another metal toxic to undesirable marine organisms.

Generally described, this invention consists of a composition containing an effective amount of salt of a non-toxic amino acid, which acid is a normal component of cell metabolism, such as glutamic or aspartic acid or a mixture of such acids, with a metal toxic to undesirable marine organisms and to a process for destroying undesirable marine life by applying such a coating to the surfaces of objects it will contact. The mechanism by which such salts protect marine-exposed surfaces is not completely understood, however, it is believed that the fact that both glutamic and aspartic acids are readily absorbed by living organisms and are utilized in the metabolism of such organisms aids in distributing the toxic metals throughout the system of the undesirable organism thereby immediately causing its death and preventing it either from attaching itself to a surface or from attacking such surface and causing its deterioration.

Various non-toxic edible amino acids which are normally used in the metabolism of animal and plant life may be employed in the acid anion of the insoluble metal salts contemplated by this invention. Particularly preferred acid anions are those derived from glutamic and aspartic acid and mixtures of the two acids, including naturally occurring mixtures as in Steffen's filtrate as well as racemic mixtures as are obtained in the synthesis of aspartic acid from maleic anhydride and ammonia.

The metal cation contemplated by this invention as a part of the effective ingredient of the antifouling agent may be any metal ion toxic to undesirable marine life such as copper, zinc, mercury, lead and the like and forming a water-insoluble salt with the amino acid. Copper, zinc and mercury are particularly preferred. The invention contemplates the use of mixed metallic cations as well as the use of mixed acid anions in the salt which comprises the active ingredient of the antifouling agent of this invention.

The particularly preferred salt contemplated by this invention, viz, the copper and zinc salts of glutamic and aspartic acids are chelating agents and are water-insoluble. All of the salts within the scope of the invention have the desirable property of water insolubility and thus are not readily leached out from the paint or other carrier with which they are admixed. Accordingly, all of these agents are of relatively long lasting effect, and, further, are restricted in their activity to organisms which seek to attach themselves to the protected surface.

The antifouling agent of this invention may be employed in any desired concentration to accomplish the desired protective result. The agent may be used in a solvent carrier to impregnate textiles, wood, etc., or may be incorporated with the article during manufacture as in an elastomer, etc. Generally, the agent is combined with a water-resistant vehicle suitable for application on the surface to be protected. From about 0.5 to 8 and preferably from about 1 to about 3 pounds of toxicant per gallon of paint, varnish, lacquer or other carrier provides an effective level of protection in marine antifouling coatings to be used on ship and boat bottoms, docks, wharves, pilings, airplane pontoons and the like. The concentration is not critical and will vary with the nature of the vehicle, the nature of the other components of the coating, the type of surface to be protected, the condition under which it is to be used, and the amount of protection desired. The metallic salts of glutamic and aspartic acids contemplated by the invention are also effective in protecting textiles, paper, rope, canvas and the like from fungal and microbial attack particularly in outdoor use where the surfaces are to be exposed to the action of water to a significant degree.

The antifouling agents of this invention are compatible with all of the substances commonly used in marine coatings including such substances as methyl methacrylate, vinyl copolymers, especially vinyl chloride-vinyl acetate copolymers, alkyd resins, phenol-formaldehyde resins, urea-formaldehyde resins, polyesters, polyurethanes, epoxy resins and the like as well as with rosin and rosin derivatives, oil base coatings such as linseed oil and tung oil coatings, various varnishes and lacquers, as damar, and the like. The antifouling agents of this invention are also compatible with silicones and hydrocarbon waxes, with various synthetic resin glues, with conventional finishes for paper and textiles comprising natural or synthetic resins, with synthetic rubber emulsions and synthetic resin emulsions and with other conventional impregnant and coating compositions for paper, textiles, wood, rope and the like.

The salts themselves are easily prepared by methods well known to the art, for example, simply by mixing a water-soluble salt of copper, zinc or other toxic metal with the desired amino acid or crude liquor containing the amino acids and separating the precipitated toxic salt.

In the following examples the salts were prepared by contacting an aqueous solution of cuprous chloride with the particular amino acid and separating out the insoluble salt formed thereby.

Having generally described the invention, the following examples are given by way of specific illustration and not of limitation.

*Examples 1-20*

Copper L-glutamate and copper DL-aspartate were ball milled to an average particle size of about 5 microns. Varying amounts of these salts were then added to a paint vehicle made up of varying ratios of rosin to vinyl resin in a xylene solvent. The vinyl resin is a copolymer of vinyl chloride containing about 91% vinyl chloride and a minor amount of vinyl acetate together with cross-linking agents and modifiers and is available under the trade name VAGH. The various paint formulation contains the following proportions of vinyl resin:

| Rosin, percent | Vinyl resin, percent |
|---|---|
| 50 | 50 |
| 65 | 35 |
| 80 | 20 |
| 90 | 10 |

The paint formulations were applied to plywood panels which were immersed in the ocean near Miami. The effectiveness of the paint formulations at inhibiting growth on the panels after 1 month's immersion is set forth in the following table. 100% effectiveness reflects that no growth of marine organisms has occurred on the coated test surface whereas 0% effectiveness would indicate that the test surface was completely covered by growth of marine organisms. The paint vehicle demonstrated no tendency to prevent growth of marine organisms.

| Example No. | Cu Compound, lbs./gal. | | Rosin, Percent of Vehicle | Percent effectiveness | |
|---|---|---|---|---|---|
| | Copper L-Glutamate | Copper dl-Aspartate | | Copper L-Glutamate | Copper dl-Aspartate |
| 1 | 1 | | 50 | 0 | |
| 2 | 2 | | 50 | 0 | |
| 3 | 3 | | 50 | 93 | |
| 4 | 4 | | 50 | 90 | |
| 5 | | 0.75 | 50 | | 85 |
| 6 | | 1.5 | 50 | | 90 |
| 7 | | 2.25 | 50 | | 85 |
| 8 | | 3.0 | 50 | | 91 |
| 9 | 1 | | 65 | 69 | |
| 10 | 2 | | 65 | 82 | |
| 11 | 3 | | 65 | 90 | |
| 12 | 4 | | 65 | 90 | |
| 13 | | 0.75 | 65 | | 90 |
| 14 | | 1.5 | 65 | | 90 |
| 15 | | 2.25 | 65 | | 95 |
| 16 | | 3.0 | 65 | | 100 |
| 17 | 1 | | 80 | 93 | |
| 18 | 2 | | 80 | 94 | |
| 19 | 3 | | 80 | 93 | |
| 20 | 4 | | 80 | 93 | |
| 21 | | 0.75 | 80 | | 70 |
| 22 | | 1.5 | 80 | | 74 |
| 23 | | 2.25 | 80 | | 69 |
| 24 | | 3.0 | 80 | | 26 |
| 25 | 1 | | 90 | 95 | |
| 26 | 2 | | 90 | 93 | |
| 27 | 3 | | 90 | 100 | |
| 28 | 4 | | 90 | 100 | |
| 29 | | 0.75 | 90 | | 42 |
| 30 | | 1.5 | 90 | | 70 |
| 31 | | 2.25 | 90 | | 84 |
| 32 | | 3.0 | 90 | | 73 |

The above formulations do not represent an optimum commercial antifouling paint. Such commercial materials necessarily consist of a blend of materials contributing to the overall effectiveness of the resulting composition. The results demonstrate the effectiveness of the compositions of the invention to prevent marine fouling, free from any ambiguity due to the presence of any other material in the paint formulations. More prolonged submersion of the paint panels resulted in depletion of the material from the surface layers with resulting loss of effectiveness. More prolonged effectiveness of the material may be achieved by varying the vehicle, by incorporation of inert pigments such as talc, etc. The films may also be improved by the incorporation of small amounts of auxiliary antifouling agents such as mercuric oxide as is well known to formulators of antifouling paints.

The above results show the effectiveness of both the salt of a pure enantiomorph and the effectiveness of a racemic mixture. Similarly, the use of the salt prepared from the crude mixture of aspartic acid and glutamic acid present in Steffen's filtrate is equally effective in formulating antifouling compositions. The compositions were equally effective when applied to glass substrates.

The manner of mixing the salt toxicant employed in this invention with the carrier is not critical. The ingredients may be admixed in any conventionally known manner.

While the compositions described above have been shown to be particularly useful in protecting ship bottoms, wharves, docks and the like, it is to be understood that the composition is equally useful as an antifoulant to protect elastomers employed to impregnate fabrics or for use in any products containing natural or artificial fibers which are exposed to marine organisms or soil decay agents that may have a deteriorating effect on such products.

We claim:

1. A marine antifouling composition consisting essentially of an organic water resistant vehicle and from about 0.5 to about 8 pounds per gallon of said vehicle of a water-insoluble salt of an amino acid selected from the group consisting of glutamic acid, aspartic acid and mixtures of glutamic and aspartic acids with a metal toxic to undesirable marine organisms.

2. A composition according to claim 1 in which the metal portion of the salt is selected from the group consisting of copper, zinc and mercury.

3. A composition according to claim 1 in which the salt is the reaction product of a water-soluble copper salt and naturally occurring mixtures consisting essentially of glutamic acid and aspartic acid.

4. A composition according to claim 1 containing from about 1 to about 3 pounds of copper glutamate per gallon of water resistant vehicle.

5. A composition according to claim 1 containing from about 1 to about 3 pounds of copper asparate per gallon of water resistant vehicle.

6. A process for inhibiting the fouling of surfaces which comprises applying to said surfaces a biocidal composition consisting essentially of an organic water-resistant carrier and from about 0.5 to about 8 pounds per gallon of said carrier of a water-insoluble salt of an amino acid selected from the group consisting of glutamic acid, aspartic acid and mixtures of glutamic and aspartic acids with the cation of a metal toxic to undesirable marine life.

7. A process according to claim 6 in which the metal cation is selected from the group consisting of copper, zinc and mercury cations.

8. A process according to claim 6 in which the salt is copper glutamate.

9. A process according to claim 6 in which the salt is copper aspartate.

10. A process according to claim 6 in which the salt is the reaction product of a water-soluble copper salt and naturally occurring mixtures consisting essentially of glutamic acid and aspartic acid.

11. A process for inhibiting the deterioration of fibrous materials exposed to undesirable marine organisms which comprises impregnating said fibrous materials with a composition consisting essentially of an organic water-resistant carrier and from about 0.5 to about 8 pounds per gallon of said carrier of a water-insoluble salt of an amino acid selected from the group consisting of glutamic acid, aspartic acid and mixtures of glutamic and aspartic acid with a metal toxic to said marine organisms.

References Cited by the Examiner

UNITED STATES PATENTS 2,443,033    6/1948    Greenstreet.

OTHER REFERENCES

Wain et al., Chemical Abstracts, vol. 41, 5669d, 1941.

ALEXANDER H. BRODMERKEL, *Primary Examiner*.

MORRIS LIEBMAN, *Examiner*.

J. B. EVANS, *Assistant Examiner*.